US010666753B2

(12) United States Patent
Srivastava

(10) Patent No.: US 10,666,753 B2
(45) Date of Patent: May 26, 2020

(54) ENHANCING API MESSAGES

(71) Applicant: The Bank of New York Mellon, New York, NY (US)

(72) Inventor: Kumar S. Srivastava, Mountain View, CA (US)

(73) Assignee: The Bank of New York Mellon, New York, NY (US)

( * ) Notice: Subject to any disclaimer, the term of this patent is extended or adjusted under 35 U.S.C. 154(b) by 92 days.

(21) Appl. No.: 15/802,156

(22) Filed: Nov. 2, 2017

(65) Prior Publication Data

US 2018/0124197 A1 May 3, 2018

Related U.S. Application Data

(60) Provisional application No. 62/416,337, filed on Nov. 2, 2016.

(51) Int. Cl.
*G06F 21/52* (2013.01)
*H04L 29/08* (2006.01)
*H04L 29/06* (2006.01)
*G06N 20/00* (2019.01)
*G06F 16/903* (2019.01)

(52) U.S. Cl.
CPC ............. *H04L 67/28* (2013.01); *H04L 67/10* (2013.01); *H04L 67/146* (2013.01); *H04L 67/2819* (2013.01); *H04L 67/32* (2013.01); *H04L 69/22* (2013.01); *G06F 16/903* (2019.01); *G06N 20/00* (2019.01); *H04L 67/02* (2013.01)

(58) Field of Classification Search
CPC ..... H04L 63/20; H04L 69/32; H04L 67/2819; H04L 67/32; H04L 67/10; H04L 69/22; G06N 20/00
See application file for complete search history.

(56) References Cited

U.S. PATENT DOCUMENTS

| | | | |
|---|---|---|---|
| 8,782,744 B1* | 7/2014 | Fuller | G06F 21/52 709/225 |
| 2009/0158407 A1* | 6/2009 | Nicodemus | H04L 63/20 726/6 |
| 2016/0125042 A1* | 5/2016 | Laredo | G06F 16/2455 707/723 |

* cited by examiner

*Primary Examiner* — Kyung H Shin
(74) *Attorney, Agent, or Firm* — Fenwick & West LLP

(57) ABSTRACT

A proxy API system intercepts and enriches API messages such as an API request or API response. The proxy API system enriches an API message by incorporating additional semantic meaning into the API message. More specifically, the proxy API system extracts features from a message and applies the features to a trained model. The trained model identifies annotations that are relevant for labeling the API message. Additionally, the proxy API system identifies reference data corresponding to the API message data and annotations to provide additional data related to content of the API message, such as additional detail about a data item in the message such as additional fields related to that item. The proxy API system enriches the API request or API response with the annotations and reference data.

20 Claims, 7 Drawing Sheets

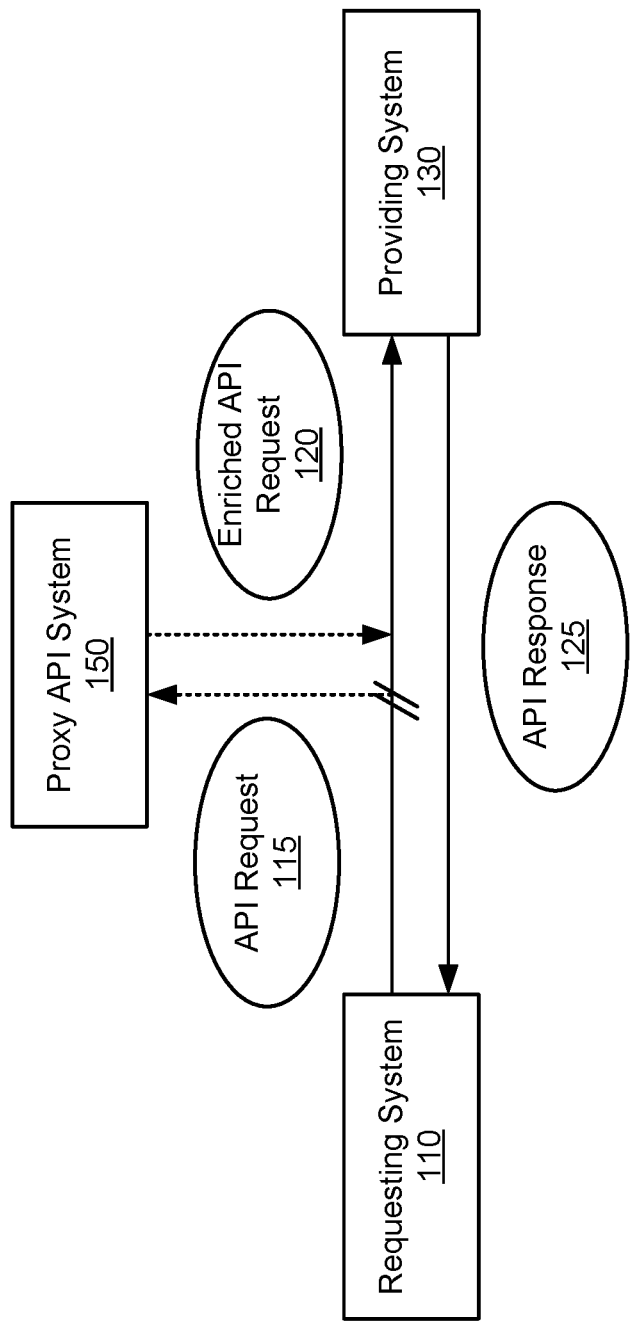

300

API Request
115

| URL 215 | Method 220 | Headers 225 | Body 230 |

Enriched API Request
120

API Response
125

Payload
410

Enriched API Response
128

US 10,666,753 B2

ENHANCING API MESSAGES

CROSS REFERENCE TO RELATED APPLICATIONS

This application claims the benefit of U.S. Provisional Application No. 62/416,337, filed Nov. 2, 2016. The content of the above referenced application is incorporated by reference in its entirety.

TECHNICAL FIELD

This disclosure generally relates to application programming interface (API) requests and API responses, and more specifically to modifying API messages with additional enriched data to enable efficient downstream processing of enriched API requests and API responses.

BACKGROUND

For various systems including enterprises and service providers, effective communication between the different systems is important to ensure that appropriate data is being passed between the systems. Many systems provide an interface or other means for interacting with data of the system, such as via an application programming interface (API). These systems are termed "providing" or "provider" systems, which receive requests from "requesting" or "requestor" systems. The API request and API response are types of API messages that may be sent according to the API. In particular, requesting systems can provide requests, such as API requests, that are processed by the providing system and responded to with an API response. However, effective use of these interfaces, particularly between different systems, developers, or applications is hampered by several obstacles.

As one example, providing systems may continue to operate an interface that is outdated or uses messaging structures that do not readily permit context or additional interpretation of content for the message. A requesting system may not be able to readily identify the proper API request type or parameters to use in a request, and the data received in a response may be difficult to accurately interpret due to the lack of contextual or semantic information in the API message. Therefore, the requesting system (or its designer) receiving the API message may have to dedicate significant resources in correctly using the API and interpreting the API response.

As another example, requests originating from requesting systems can be error prone. For example, the configuration of the requesting system is often conducted in isolation by developers who personally interpret the documentation provided for the API. However, developer interpretations can be incorrect and therefore, the API request provided by a requesting system can be incorrect. This leads to downstream processing problems as a providing system analyzes and responds to the incorrect API request. In addition, API requests may be correctly formatted and therefore produce a response by the providing system, but may provide data for the response that is unexpected by the designer of the requesting system in ways that may not be readily identifiable. For example, a response to a database query may designate information of a type expected by the requesting system, but include different or unexpected results than suggested by the API or its documentation.

Additionally, in scenarios where the API request accurately captures the intention of a developer, each providing system can incorrectly respond to an API request. Conventionally, each providing system implements its own response parsing and actuation system to process an API request. This process results in excessive consumption of resources such as wasted time, computational resources, and manpower.

SUMMARY

Embodiments described herein enable a requesting system or providing system to correctly interpret messages through enrichment of API messages. Although each of these systems may provide API messages as defined by the API, a proxy API system receives and enriches a message before sending the message to its recipient (i.e., a providing system for an API request or a requesting system for an API response). An enriched API message, which can be either an enriched API response or enriched API request, includes semantic information such as annotations or reference data that provide additional context to the initial API message (e.g., an initial API request or API response). As described herein, a proxy API system intercepts API messages and enriches API messages with the annotations and reference data. Implementation of the proxy API system has several benefits. As one example, the proxy API system can enable providing systems that employ APIs with difficult-to-parse messaging structures or poorly-documented APIs to effectively communicate with a requesting system without requiring extensive testing by the requesting system or revision of the providing system's API. As another example, the proxy API system enables the centralized interpretation of API messages as opposed to the independent interpretation of API messages by each individual system or by different requesting systems. This reduces the consumption of resources due to the performance of redundant work while also avoiding disparate interpretations of API messages.

In various embodiments, the proxy API system processes an API request or response by extracting features from data fields of the API request or response. For example, the proxy API system extracts features from data fields such as the URL, method, headers, and body of an API request or a payload of an API response. The proxy API system provides the extracted features as input to a machine learning model that identifies annotations that are relevant for the API request or API response. An annotation provides semantic meaning to the API request or API response. For example, if an API request is requesting for a data set with an attribute of "EID" and a type "string," the proxy API system may identify an annotation of "employee ID" that corresponds to the API request.

Furthermore, the proxy API system can use the added semantic meaning of an annotation to identify additional context for an API request or API response. Additional context can include reference data stored by the proxy API system that is mapped to one or more annotations. For example, the annotation of "employee ID" can be mapped to additional context information related to the "employee ID" such as the employee's name, address, manager's name, social security number, and the like.

The proxy API system enriches the original API request or API response with the annotations and reference data. Thus, the proxy API system generates and provides an enriched API message such that the subsequent system that receives the enriched API message can more accurately interpret the content of the API message and perform the subsequent workflow.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 1B depicts an overall flow process for generating an API request, enriching the API request, and generating a response to the API request, in accordance with an embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Overall System Environment

Figure 1A:
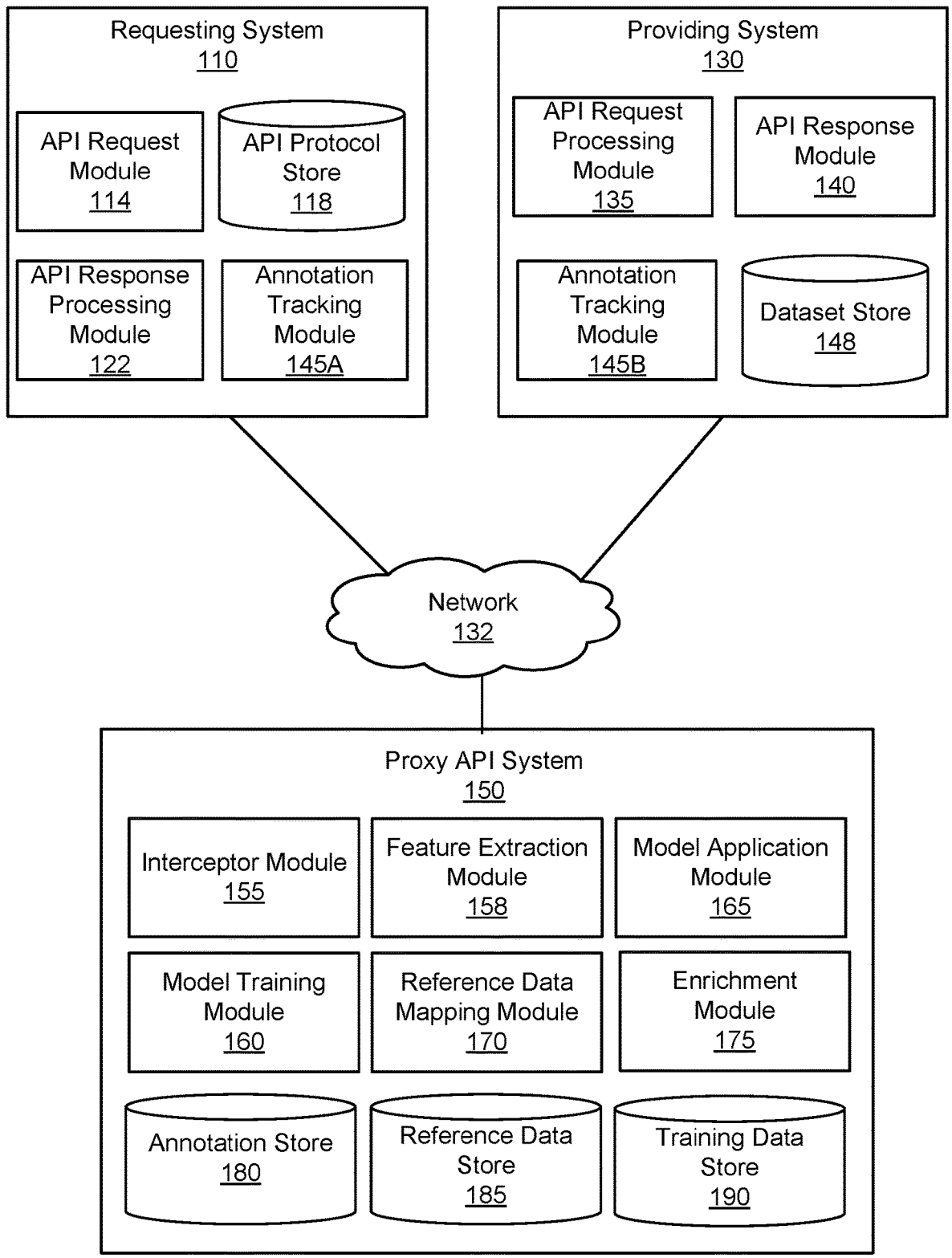
FIG. 1A depicts an overall system environment, in accordance with an embodiment.

FIG. 1A depicts an overall system environment, in accordance with an embodiment. The system environment 100 can include a requesting system 110, a proxy API system 150, and a providing system 130. The requesting system 110 may request various services from the providing system 130 via a defined interface, such as an application programming interface (API). These services may implement various types of services, such as requests for database access and modifications, requests for media content, web page navigation and display, and more. To use the interface, the requesting system 110 provides an API request for processing by the providing system 130 that generates an API response to the requesting system 110. The particular API request may define a type of request and include various parameters for the requested service as discussed herein.

Rather than directly communicate API messages between the requesting system 110 and the providing system 130, the requests are received by the proxy API system 150 which enhances the requests to provide additional semantic information to the API messages. This information may include annotations to the API messages as well as reference data related to information in the API messages. An annotation describes a type or label for a data field in the API message, and the reference data provides additional, related data relevant to the contents of an API message. Thus, the annotation may label a data field of an API message, and the reference data may provide additional fields of data related to an API message. As an example, an API response may include a field specifying a string of "(202) 555-1234." An annotation may identify a label for this field describing the string as a telephone number and reference data may describe additional fields of interest, such as an address of "123 Main St." or a business "Joe's pizza" associated with the field in the API response. The proxy API system 150 may add this information to the response to thus enrich the data in the API message and improve the quality of the API responses returned to the requesting system 110.

Though termed a requesting system 110 and a providing system 130 with respect to the API request and API response, these systems are so-described to describe the flow of a particular API request from a requestor to a response system. Accordingly, for different interfaces and interface requests, the particular systems serving these functions may perform alternate roles for those responses. In some embodiments, the system environment 100 can include multiple requesting systems 110 or multiple providing systems 130. In various embodiments, the proxy API system 150 and the providing system 130 are associated with a single entity. In this example, the proxy API system 150 may act as an intermediate proxy for the entity while the providing system 130 is the backend server of the entity.

Referring to FIG. 1B, which depicts an overall flow process for generating an API request 115, generating an enriched API request 120, and generating an API response 125 to the enriched API request 120, in accordance with an embodiment. Generally, the requesting system 110 generates and sends an API request 115. In one embodiment, the requesting system 110 generates the API request 115 to be sent to the providing system 130. In this case, the API request 115 may be addressed to the providing system 130 and the proxy API system 150 intercepts the API request 115 and enriches the API request 115 with additional contextual information. In some embodiments, the requesting system 110 generates the API request 115 and addresses it to the proxy API system 150. Here, the proxy API system 150 receives the API request 115 and enriches the API request 115 with additional contextual information. The proxy API system 150 provides the enriched API request 120 to the providing system 130.

Figure 1C:
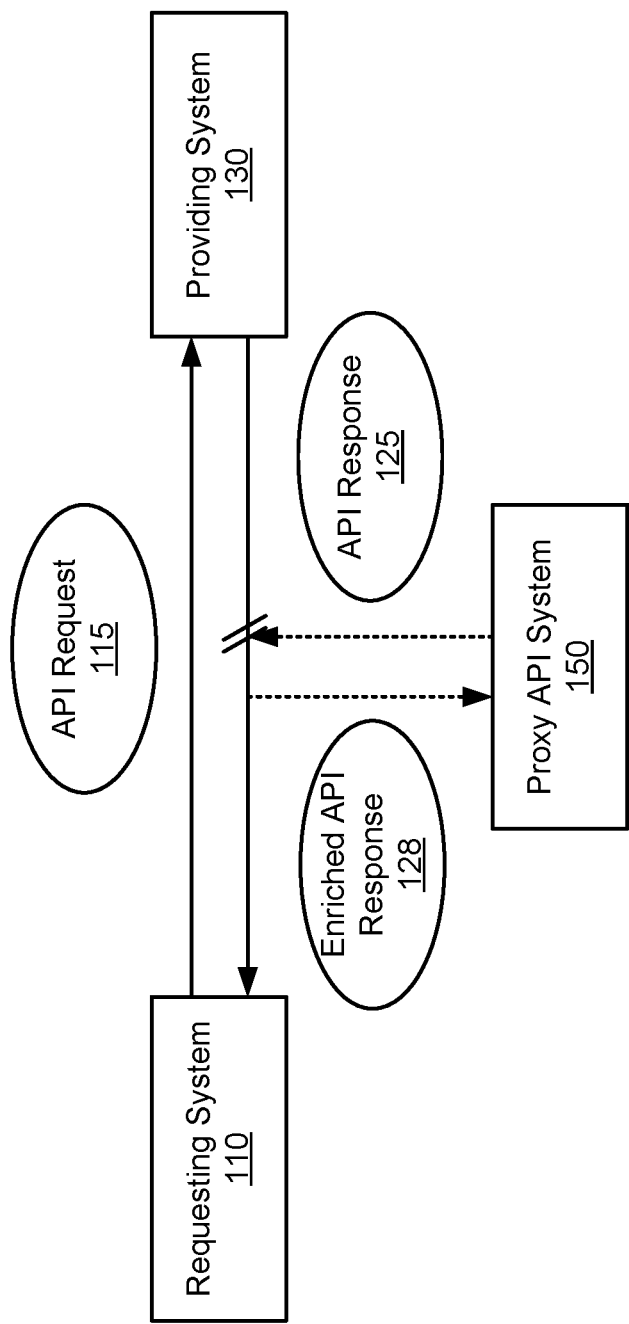
FIG. 1C depicts an overall flow process for generating an API response and enriching the API response, in accordance with an embodiment.

Referring to FIG. 1C, which depicts an overall flow process for generating an API response 125 and an enriched API response 128 in accordance with an embodiment. While in FIG. 1B, the API request 115 was enriched, in the example of FIG. 1C, the proxy API system 150 enriches an API response 125 from the providing system 130. Specifically, the requesting system 110 first sends an API request 115 to the providing system 130 which processes the API request 115 and generates the API response 125. The proxy API system 150 receives or intercepts the API response 125 and generates an enriched API response 128 for the requesting system 110.

In various embodiments, the proxy API system 150 can perform both functions described in FIG. 1B and FIG. 1C. In other words, the proxy API system 150 can intercept and enrich an API request 115 and further intercept and enrich an API response 125. More specifically, the requesting system 110 sends an API request 115. The proxy API system 150 receives or intercepts the API request 115. The proxy API system 150 enriches the API request 115 to generate an enriched API request 120 for the providing system 130. When the providing system 130 responds with the API response 125, the proxy API system 150 receives or intercepts the API response 125 and generates an enriched API response 128 for the requesting system 110.

In various embodiments, the proxy API system 150 enriches an API request 115 or enriches an API response 125 by combining the API request 115 or the API response 125 with semantic information. Semantic information added to the API request 115 or API response 125 can improve how the API request 115 or API response 125 are treated by the workflows of the providing system 130 and requesting system 110, respectively.

An example of semantic information can be annotations that are relevant to the API request 115 or the API response 125. Generally, an annotation is a descriptive tag that describes information in a data field of an API request 115 or API response 125. This descriptive tag may thus provide additional information about the contents of the API request or API response, for example provide a label or a type of the contents (such as a field) of the API message. An annotation is beneficial as in many cases, an API request or response may lack a description of the type of information provided in the message. As an example scenario, an API request 115 may relate to a product in a catalog and specify a string to search the catalog, but provide no designation of the type of the string. Thus, an annotation for this string can be a label designating the string as a product name, product category, or stock keeping unit (SKU). In various embodiments, semantic information can further include reference data that adds additional data fields of information for an API message. Generally, reference data provides more details to the existing information included in an API request 115 or API response 125. Referring to the previous example, for an API request having a field annotated as a name of the product, the reference data may be identified to add additional types of information related to that product name, such as a category of the product, or a product SKU number. As a result, by annotating and supplementing an API message, an API message that initially includes a string of an unknown type can have its type annotated and additional data fields added for related information.

Altogether, by enriching both the API request 115 and the API response 125, the proxy API system 150 enables the providing system 130 and the requesting system 110 to more accurately interpret each request or response. Therefore, each of the requesting system 110 and providing system 130 can accurately respond to minimize errors that typically arise due to the implementation of conventional API requests. Specifically, providing an enriched API request 120 to the providing system 130 enables the providing system 130 to generate an API response 125 that is more accurate for the requesting system 110. Similarly, providing an enriched API response 128 to the requesting system 110 enables the requesting system 110 to accurately interpret and utilize the data provided in the enriched API response 128.

Network

The network 132 facilitates communications between the requesting system 110, proxy API system 150 and the providing system 130. The network 132 may be any wired or wireless local area network (LAN) and/or wide area network (WAN), such as an intranet, an extranet, or the Internet. In various embodiments, the network 132 uses standard communication technologies and/or protocols. Examples of technologies used by the network 132 include Ethernet, 802.11, 3G, 4G, 802.16, or any other suitable communication technology. The network 132 may use wireless, wired, or a combination of wireless and wired communication technologies. Examples of protocols used by the network 132 include transmission control protocol/Internet protocol (TCP/IP), hypertext transport protocol (HTTP), simple mail transfer protocol (SMTP), file transfer protocol (TCP), or any other suitable communication protocol.

Requesting System and Providing System

In various embodiments, each of the requesting system 110 and/or providing system 130 can be embodied as an electronic device. For example, each of the requesting system 110 and/or providing system 130 can be a personal computer (PC), a desktop computer, a laptop computer, a notebook, a tablet PC executing an operating system, for example, a Microsoft Windows-compatible operating system (OS), Apple OS X, and/or a Linux distribution. In various embodiments, each of the requesting system 110 and/or the providing system 130 is a cloud server or rack server. In other words, the functions performed by either the requesting system 110 or providing system 130 may be distributed across multiple processors and/or electronic devices. In some embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

The requesting system 110 is a system that generates and sends an API request 115. The providing system 130 is a system that receives an API request 115, such as an enriched API request 120, and generates an API response 125 sent back to the requesting system 110. Each of the requesting system 110 and the providing system 130 can be associated with an entity or an enterprise. Therefore, the requesting system 110 and the providing system 130 can be different entities that communicate with one another through API requests 115 and API responses 125.

Referring first to the requesting system 110, it may include an API request module 114, an API protocol store 118, an API response processing module 122, and an annotation tracking module 145A. The API request module 114 generates an API request 115 for the providing system 130. In one embodiment, the API request module 114 generates an API request 115 in response to a user interaction provided by a user of the requesting system 110. For example, a user of the requesting system 110 may provide an interaction requesting access to a bank account balance of the user that is stored by the providing system 130. Therefore, the API request module 114 generates an API request 115 for the providing system 130 to provide the dataset representing the account balance of the user. In other embodiments, the API request module 114 generates an API request 115 without the need for user interaction. For example, the API request module 114 may generate and send an API request 115 for a providing system 130 to provide the user's account balance such that the user's account balance is stored and readily available for the user of the requesting system 110.

In one embodiment, the API request module 114 generates an API request 115 that conforms to the requirements of the providing system 130 such that the providing system 130 can interpret the API request 115. The API request module 114 may retrieve a specific API protocol for the providing system 130 that is stored in the API protocol store 118 and generates the API request 115 according to the retrieved API protocol. The specific API protocol can be previously provided by the providing system 130 and stored by the requesting system 110 in the API protocol store 118.

Figures 3A, 3B:
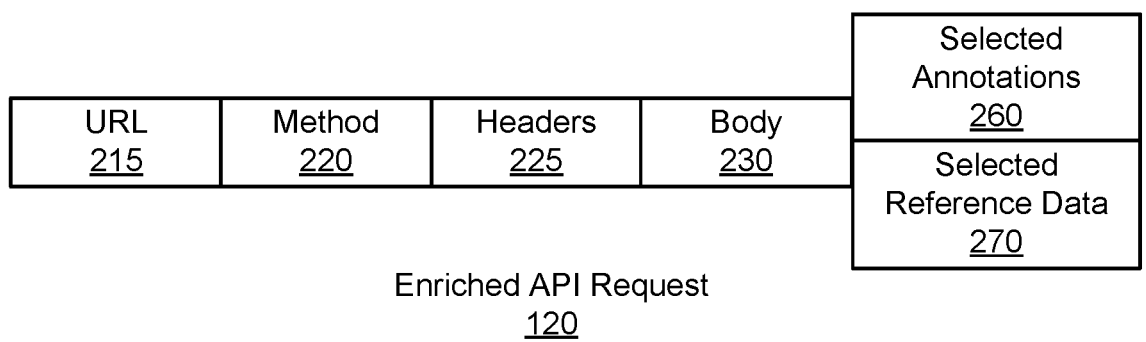
FIG. 3A depicts an example API request, in accordance with an embodiment.
FIG. 3B depicts an example enriched API request, in accordance with an embodiment.

Reference is made to FIG. 3A, which depicts an example API request 115 that is generated by the API request module 114, in accordance with an embodiment. Here, an API request 115 may include the individual data fields of a URL 215, a method 220, one or more headers 225, and a body 230. In various embodiments, each API request 115 can be expressed using JavaScript Object Notation (JSON). Therefore, the individual data fields of the API request 115 are expressed using textual string values. In various embodiments, the individual data fields, the ordering of the individual data fields, and/or the content of each the individual data fields of the API request 115 can differ based on the providing system's 130 API protocol that is retrieved from the API protocol store 118.

Referring to the particular API request 115 embodiment shown in FIG. 3A, the URL 215 can refer to resources hosted by the providing system 130. The method 220 can be any one of various commands such as GET, POST, PUT, PATCH, DELETE, COPY, HEAD, OPTIONS, LINK, UNLINK, PURGE, LOCK, UNLOCK, PROPERTYFIND, VIEW. Therefore, the providing system 130 can understand how to process the API request 115 given the method 220.

Headers 225 of the API request 115 can provide information as to the API request 115 such that the API request 115 can be processed. As one example, a header 225 can include authentication information of the requesting system 110 that is sending the API request 115. As another example, the header 225 can include identifying information (e.g., a user identifier) of a user of the requesting system 110 that is sending the API request 115. The particular headers 225 of the API request 115 can be dependent on the specific API protocol previously provided by the providing system 130.

The body 230 of the API request 115 provides the main content of the API request 115. The body 230 can include attributes, request parameters, query parameters, and object keys. For example, if the method 220 of the API request 115 is a GET function, then the body 230 of the API request 115 indicates the data that is to be retrieved from the providing system 130. If the method 220 of the API request 115 is a POST function, then the body 230 of the API request 115 indicates the data that is to be posted by the providing system 130.

Returning to FIG. 1A, the API request module 114 sends the API request 115. In one embodiment, the API request module 114 sends the API request 115 to the providing system 130. In another embodiment, the API request module 114 sends the API request 115 to the proxy API system 150. For example, the API request module 114 can generate the URL 215 of the API request 115 to be directed towards a resource of either the providing system 130 or the proxy API system 150 so that the API request 115 is sent to the providing system 130 or the proxy API system 150, respectively.

Figures 4A, 4B:
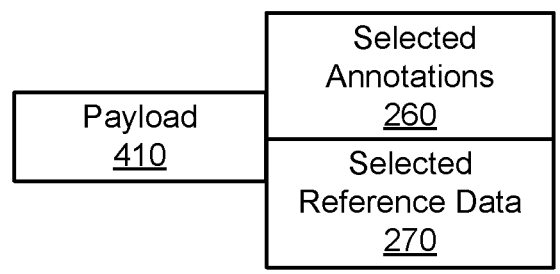
FIG. 4A depicts an example API response, in accordance with an embodiment.
FIG. 4B depicts an example enriched API response, in accordance with an embodiment.

Referring now to the API response processing module 122, it receives an API response 125 or an enriched API response 128 that was enriched by the proxy API system 150. Reference is briefly made to FIG. 4B, which depicts an enriched API response 128, in accordance with an embodiment. Here, the enriched API response 128 includes a payload 410 and further includes semantically relevant information such as selected annotations 260 and selected reference data 270. The process of selecting annotations 260 and reference data 270 for generating an enriched API response 128 is described in further detail below in relation to the proxy API system 150. Given the enriched API response 128, the API response processing module 122 can process the payload 410 included within the enriched API response 128 while further using the annotations 260 and reference data 270.

In various embodiments, the API response processing module 122 determines whether the data included in the enriched API response 128 is correct for the previously sent API request 115. In one embodiment, the API response processing module 122 determines whether the data in the enriched API response 128 is correct by investigating the selected annotations 260 and selected reference data 270 that are included in the enriched API response 128. As an example, the API response processing module 122 can receive an enriched API response 128 that includes a payload 410 that includes information relevant to a particular product. Additionally, the enriched API response 128 includes semantic information such as the selected annotations 260 and selected reference data 270 that specify the product ID, product SKU number, and product category. If the API response processing module 122 identifies conflicting information in relation to the semantic information provided in the enriched API response 128, the API response processing module 122 can reject the enriched API response 128. For example, if the API response processing module 122 receives a particular product SKU number in the enriched API response 128, but also identifies that the same product SKU number is associated with a different product that is known to the requesting system 110, the API response processing module 122 can reject the enriched API response 128. In such a scenario, the API response processing module 122 can provide an indication to the API request module 114 to resend the API request 115. The API response processing module 122 can further notify the annotation tracking module 145A. As described in further detail below, the annotation tracking module 145A can provide feedback to the proxy API system 150 in relation to the conflicting semantic information.

The providing system 130 processes an enriched API request 120 and generates an API response 125 to be provided back to the requesting system 110. To perform these functions, the providing system 130 may include an API request processing module 135, API response module 140, an annotation tracking module 145, and a dataset store 148.

The API request processing module 135 receives the enriched API request 120 (see FIG. 1B) and processes the enriched API request 120. FIG. 3B depicts an example enriched API request 120, in accordance with an embodiment. Here, the enriched API request 120 can include data fields that were included in the original API request 115 (see FIG. 3A) such as the URL 215, method 220, headers 225, and body 230. Additionally, the enriched API request 120 includes semantically relevant information including selected annotations 260 and selected reference data 270. To process the enriched API request 120, the API request processing module 135 parses and extracts the individual data fields from the enriched API request 120. As an example, the API request processing module 135 may tokenize the string values included in the enriched API request 120 to separate the data fields included in the original API request 115 and the added semantic information (e.g., annotations 260 and reference data 270) that were supplemented by the proxy API system 150. The API request processing module 135 provides each data field of the enriched API request 120 to the API response module 140.

The API request processing module 135 takes action based on the command included in the method 220 of the enriched API request 120 and the body 230 of the enriched API request 120. In various embodiments, the API request processing module 135 uses the selected annotations 260 and selected reference data 270 to supplement the information in the body 230 of the enriched API request 120 so that the API request processing module 135 takes the appropriate action.

As an example, if the method 220 is a GET command, the API request processing module 135 accesses data from the dataset store 148 to retrieve a dataset. In one embodiment, the API request processing module 135 can analyze the body 230 of the enriched API request 120 to understand and identify the appropriate data from the dataset store 148. In some embodiments, the API request processing module 135 further analyzes the selected annotations 260 and selected reference data 270 to identify the appropriate data from the dataset store 148. As a particular example, the body 230 of the enriched API request 120 can include the name of an individual such as "John Smith." However, there may be numerous datasets pertaining to a "John Smith" in the dataset store 148. The enriched API request 120 can include a selected annotation 260 that identifies that "John Smith" is a name of an employee while the selected reference data 270 can further identify data associated with "John Smith" such as an employee ID number, an employer, a middle name, and the like. Therefore, the API request processing module 135 can use the selected annotations 260 and selected reference data 270 to understand the appropriate datasets stored in the dataset store 148 that pertain to the particular "John Smith."

The API response module 140 generates an API response 125. Reference is made to FIG. 4A, which depicts an example API response 125, in accordance with an embodiment. The example API response 125 includes a payload 410 that is generated by the API request processing module 135. In other embodiments, the API response 125 can include additional data fields. In various embodiments, the API response module 140 generates an API response 125 based on the action taken by the API request processing module 135. As an example, if the API request processing module 135 retrieves a dataset from the dataset store 148 in response to a GET command, the payload 410 can include the retrieved dataset from the dataset store 148. As another example, if the API request processing module 135 posts data in response to a POST command, the payload 410 can include an indication of a success or failure of the post.

Returning to FIG. 1A, each of the requesting system 110 and providing system 130 further includes an annotation tracking module 145A/B. Each annotation tracking module 145A/B tracks the usage of selected annotations 260 that are included in an enriched API request 120 or enriched API response 128. Specifically, annotation tracking module 145A tracks the usage of selected annotations 260 included in an enriched API response 128 by the API response processing module 122. Annotation tracking module 145B tracks the usage of selected annotations 260 included an enriched API request 120 by the API request processing module 135.

Each annotation tracking module 145A/B can generate statistics as to how annotations are used by the API response processing module 122 and API request processing module 135. For example, each annotation tracking module 145A/B can generate statistics such as a total number of times that an annotation is used by the system, a frequency of use of the annotation, a percentage representing the number of times an annotation was used in view of the number of times the annotation was included in a request or response, a number of times that an annotation was rejected, a frequency of rejection, or a percentage representing the number of times an annotation was rejected in view of the number of times the annotation was included in a request or response. In various embodiments, each annotation tracking module 145A/B provides the generated statistics to the proxy API system 150. Therefore, the proxy API system 150 can more accurately enrich subsequent API messages.

Proxy API System

The proxy API system 150 can be one or more electronic devices. In some embodiments, the proxy API system 150 can be embodied as a cloud server or rack server. In other words, the functions and algorithms performed by the proxy API system 150 can be distributed across multiple processors and/or electronic devices. In some embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

The proxy API system 150 may include an interceptor module 155, a feature extraction module 158, a model training module 160, a model application module 165, a reference data mapping module 170, an enrichment module 175, an annotation store 180, a reference data store 185, and a training data store 190. Together, these modules enable the proxy API system 150 to enrich an API request 115 or an API response 125.

Generally, the interceptor module 155 intercepts an API message. The feature extraction module 158 extracts features from data fields of the API message and provides the features to the model application module 165. The model application module 165 applies the features as input to a model previously trained by the model training module 160. The trained model determines one or more annotations that describe information in the data fields of the API message. The reference data mapping module 170 identifies reference data that can further supplement the determined annotations and information in the data fields of the API message. The enrichment module 175 enriches the API message by combining the API message with the one or more annotations and the reference data. Thus, an enriched API message can be provided to the requesting system 110 or providing system 130.

In various embodiments, a subset of the modules depicted in the proxy API system 150 can be additionally or alternatively included in the requesting system 110 and the providing system 130. As one example, such modules include the feature extraction module 158, the model application module 165, and the annotation store 180. In these embodiments, the requesting system 110, providing system 130, and the proxy API system 150 can share the annotations in the annotation store 180. Therefore, the functions of extracting features of an API message and identifying annotations that are relevant to information in data fields of an API message response can be performed by the requesting system 110 and providing system 130 instead of the proxy API system 150. In accordance with these embodiments, the API request 115 and/or the API response 125 can each include annotations.

Enriching API Requests

Figure 2:
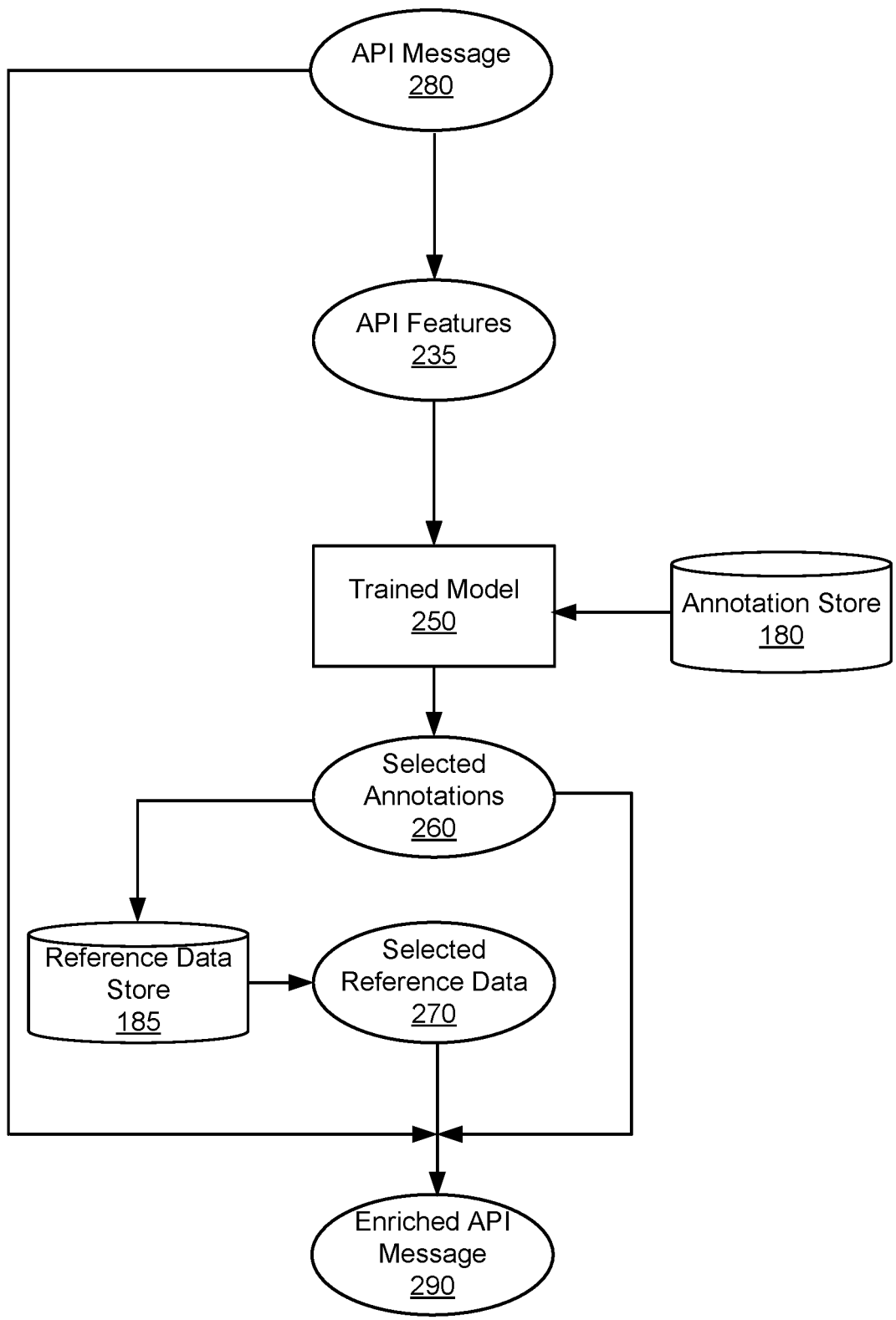
FIG. 2 depicts an example block diagram process for enriching an API message, in accordance with an embodiment.

Reference will be made to FIG. 2, which depicts an example block diagram process enriching an API message 280 to generate an enriched API message 290, in accordance with an embodiment. As used hereafter, an API message 280 refers to either an API request 115 or API response 125 and the enriched API message 290 refers to either the enriched API request 120 or enriched API response 128.

Referring to FIG. 1A, the interceptor module 155 intercepts an API message 280 such as an API request 115 originating from an requesting system 110 or an API response 125 originating from a providing system 130. In one embodiment, the interceptor module 155 intercepts API requests 115 or API responses 125 that originate from an Internet Protocol (IP) address of the requesting system 110 or the providing system 130, respectively. In one embodiment, the interceptor module 155 intercepts API requests 115 based on a data field of the API message 280. For example, the interceptor module 155 intercepts an API request 115 based on the URL 215 included in the API request 115. Such a URL 215 can be directed to a resource hosted on the providing system 130.

The interceptor module 155 determines whether the API request 115 or API response 125 includes annotations. In embodiments where the requesting system 110 and/or providing system 130 employ the feature extraction module 158, model application module 165, and annotation store 180, a received API request 115 or API response 125 includes annotations. In these embodiments, the interceptor module 155 determines that annotations already exist in the intercepted API request 115 and API response 125 and therefore, provides the API request 115 and API response 125 to the reference data mapping module 170.

In other embodiments, the interceptor module 155 determines that annotations do not exist in the API request 115 and API response 125 or that additional annotations can be included in the API request 115 and API response 125. In these embodiments, the interceptor module 155 provides the intercepted API request 115 or API response 125 to the feature extraction module 158. The feature extraction module 158 extracts features, such as API features 235 as shown in FIG. 2, from each API request 115 or API response 125 and provides the extracted features to the model application module 165. In various embodiments, to extract API features 235, the feature extraction module 158 tokenizes the individual data fields (e.g., the URL 215, method 220, headers 225, and body 230) of the API request 115 or the individual data fields (e.g., the payload 410) of the API response 125. For example, as the API request 115 and the API response 125 can be expressed in JSON format, the feature extraction module 158 tokenizes the text strings included in the individual data fields of the API request 115 and API response 125. In various embodiments, the feature extraction module 158 utilizes pattern matching techniques to parse individual words or phrases from each data field of the API request 115 and API response 125. Therefore, the tokenized text strings, such as the individual words or phrases, are provided as API features 235 to the model application module 165. In various embodiments, API features 235 can further include an indication of the data field (e.g., URL 215, method 220, headers 225, body 230, or payload) that each tokenized text string was extracted from.

In various embodiments, the feature extraction module 158 can further infer a general subject matter or domain from the tokenized text strings and can include the inferred domain as a feature in the API features 235. Such a feature will be hereafter referred to as a domain feature. An inferred semantic meaning can be an inferred subject matter or domain that the API request 115 or API response 125 is related to. As a specific example, if an API request 115 is a request for a user's bank account balance, the feature extraction module 158 can infer a finance domain for this request by analyzing the tokenized text strings with respect to the finance domain (and potentially additional domains). For example, within the API request for a bank account balance may be tokenized terms such as "currency" "value" "balance" "statement" "account" "number." Each of these tokenized string values may be analyzed to identify a match with terms associated with the finance domain. Other example domains can include healthcare, technology, real estate, construction, and the like.

The model application module 165 analyzes the API features 235 and selects annotations 260 and reference data 270 to be combined with the API request 115 to generate the enriched API request 120. Referring to FIG. 2, the model application module 165 applies the API features 235 as input to a trained model 250. The process of generating the trained model 250 is described below in relation to the model training module 160.

Given the API features 235, the trained model 250 analyzes the annotations in the annotation store 180 and identifies selected annotations 260 that best describe the API features 235 of the API request 115 or API response 125. In various embodiments, the trained model 250 assigns a score to each annotation. In various embodiments, the trained model 250 assigns a score to a subset of annotations. For example, the trained model may exclude annotations that are irrelevant to the particular subject matter or domain of the API request 115 or API response 125 based on the input domain feature. Thus, the trained model 250 scores the subset of annotations that are relevant to the domain feature. In one embodiment, a threshold number of the highest scored annotations outputted by the trained model 250 can be identified as selected annotations 260.

The reference data mapping module 170 identifies selected reference data 270 based on the selected annotations 260. In various embodiments, the reference data in the reference data store 185 is mapped to annotations in the annotation store 180. Therefore, based on the mapping between annotations in the annotation store 180 and reference data in the reference data store 185, the reference data mapping module 170 can identify selected reference data 270 based on the selected annotations 260.

As a specific example, selected annotations 260 can be a label of a "telephone number." Here, the reference data mapping module 170 queries the reference data store 185 to identify reference data 270 that maps to the selected annotations 260 and to the data in the API message that the selected annotations 260 were determined from. For example, reference data 270 that maps to the string value of "(202) 555-1234" that is labeled with the "telephone number" annotation 260 can be a string value of "123 Main St." or a string value of "Joe's pizza." Each of the reference data 270 can be labeled with descriptive labels such as an "address" for "123 Main St." and "Entity name" for "Joe's pizza." In various embodiments, a mapping between reference data 270 and a selected annotation 260 can be represented by a common index in a database. For example, each of "(202) 555-1234," "123 Main St.," and "Joe's pizza" can be stored in a common structure (e.g., a row or column) of a table that is indexed by a common index. Therefore, the reference data 270 of "123 Main St." and "Joe's pizza" can be identified through the common index.

Referring back to FIG. 1A, the enrichment module 175 combines the selected annotations 260, the selected reference data 270, and the original API message 280. In other words, the enrichment module 175 generates the enriched API request 120 or enriched API response 128 that includes the additional semantic information of selected annotations 260 and selected reference data 270.

In one embodiment, the enrichment module 175 appends the selected annotations and selected reference data 270 to the API request 115 or API response 125. As an example, an API response 125 can include the following:

{Product A, Product B, Product C, Product D, ... }

The enriched API response 128, when incorporating the selected annotations 260 and the selected reference data 270, can be expressed as:

{Product A, Product B, Product C, Product D, ...}{"Context" =

{Product A = {Product Name = Product, Product ID = A1234,

Product SKU = V8E038, Product Catergory = Electronics.}}

Here, the new JSON key called "Context" refers to the selected annotations 260 (e.g., "Product Name," "Product ID," "Product SKU", and "Product Category") and the selected reference data 270 (e.g., "Product," "A1234," "V8E038," "Electronics").

Here, appending the selected annotations 260 and the selected reference data 270 enables the requesting system 110 and providing system 130, which will receive the enriched API response 128 and enriched API request 120 respectively, to readily identify which portions of the enriched API response 128 and enriched API request 120 were supplemented by the proxy API system 150 and which portions were originally part of the API response 125 and API request 115, respectively. Referring to the previous example, the JSON key "Context" is an indication that delineates the semantic information added by the proxy API system 150 from the data fields of the original API request 115 or original API response 125. In other embodiments, other indications can be used to separate the semantic information from the data fields of the original API request 115 or API response 125.

Training Machine Learning Models

Referring to the model training module 160, it trains one or more machine learning models. Therefore, as described above, the trained models 250 can be used to identify annotations 260 to be included in an enriched API request 120 or enriched API response 128. In various embodiments, a machine learning model is one of a decision tree, an ensemble (e.g., bagging, boosting, random forest), linear regression, Naïve Bayes, neural network, or logistic regression. Different machine learning techniques can be used to train the machine learning model including, but not limited to decision tree learning, association rule learning, artificial neural network learning, deep learning, support vector machines (SVM), cluster analysis, Bayesian algorithms, regression algorithms, instance-based algorithms, and regularization algorithms.

The model training module 160 trains the models using training data from the training data store 190. Training data includes prior enriched API requests and enriched API responses that were received by the providing system 130 and requesting system 110, respectively. Each prior enriched API request and enriched API response includes annotations and reference data. Additionally, training data includes the prior performance of the annotations. As described above in relation to the annotation tracking module 145A/B, the performance of annotations can be statistics that describe how annotations were used by either the API response processing module 122 or API request processing module 135. In various embodiments, the prior performance of the annotations can be used as output labels for training the model.

To train a model, the model training module 160 provides, as input to the model, API features extracted from the prior enriched API request or API response. API features can be tokenized textual strings extracted from the prior enriched API request or API response. With these inputs, each model predicts a score for each annotation in the annotation store 180. The predicted score represents a degree of relevance between the annotation and the API request or API response. The model training module 160 can compare the predicted scores for the annotations to the output label of the training data, which can be the statistics that describe the performance of the annotation. Over time, the model training module 160 can train a model to assign high scores to annotations that are relevant given the features of an API request or API response and to assign low scores to annotations are less relevant given the features of an API request or API response.

Process for Enriching an API Request or API Response

Figure 5:
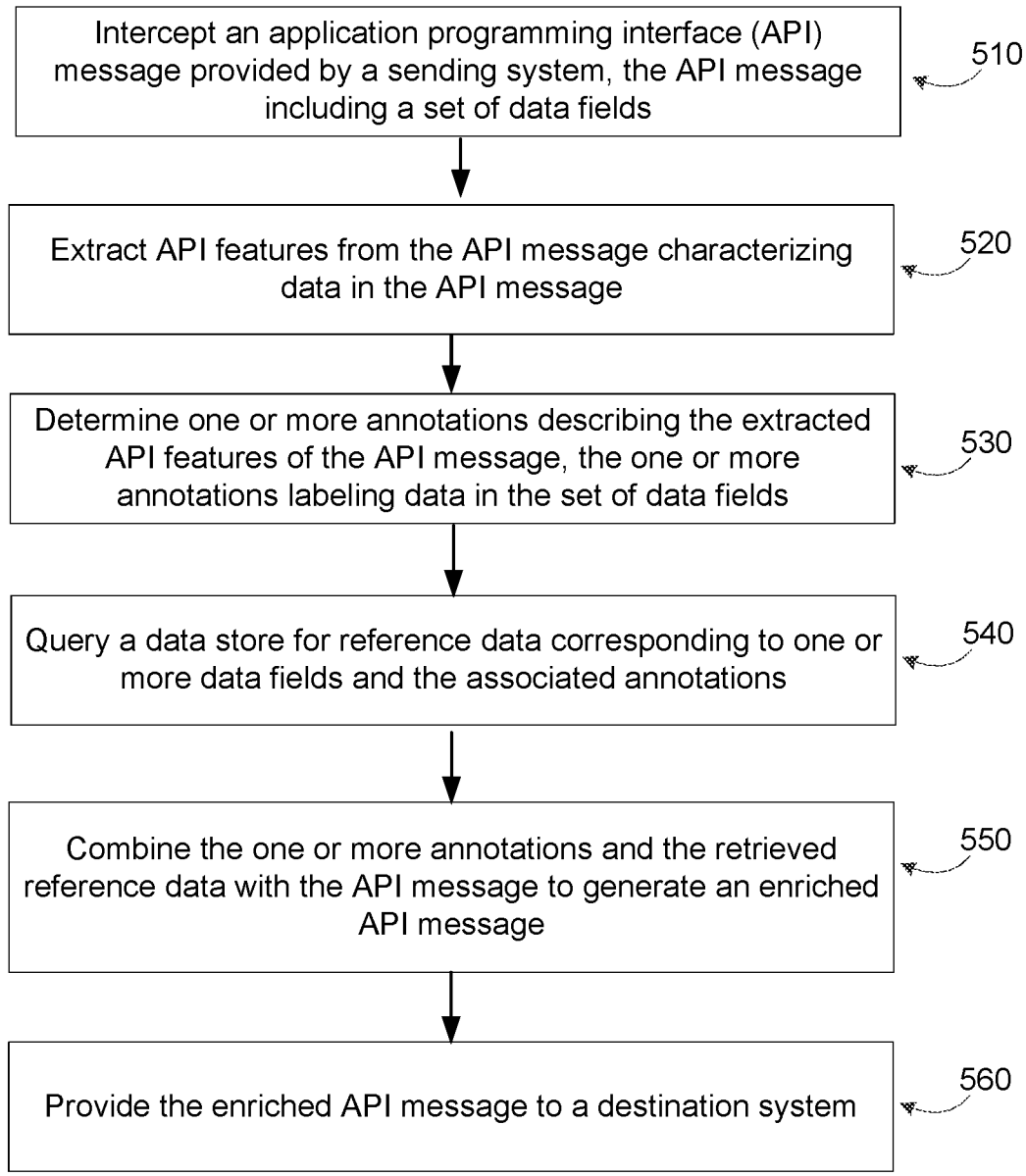
FIG. 5 is a flow process for enriching an API message, in accordance with an embodiment.

FIG. 5 is a flow process for enriching an API request 115 or an API response 125, in accordance with an embodiment.

The proxy API system 150 intercepts 510 an API message provided by a sending system. The API message can be either an API request 115 or API response 125. Here, an API request 115 is intended for the providing system 130 whereas an API response 125 is intended for the requesting system 110. The proxy API system 150 extracts 520 API features 235 from the API message. As an example, the proxy API system 150 can tokenize the textual string values in the API message and use the tokenized text strings as features.

The proxy API system 150 determines 530 one or more annotations 260 that describe the extracted API features 235. In one embodiment, the proxy API system 150 applies the API features 235 as input to a trained model 250. The trained model 250 outputs scores for various annotations and selects annotations 260 that are relevant for the API request 115 or API response 125. Each selected annotation 260 provides semantic meaning by labeling data in the set of data fields in the API message. Given the one or more annotations 260, the proxy API system 150 queries 540 a data store and retrieves reference data 270 corresponding to the one or more data fields and the associated annotations 260. In one embodiment, the proxy API system 150 identifies the reference data from the reference data store 185 by using a stored mapping between the annotations 260 and the reference data 270.

The proxy API system 150 combines 550 the annotations 260 and the reference data 270 with the original API message (e.g., original API request 115 or original API response 125). As one example, the proxy API system 150 appends the annotations 260 and the reference data 270 at the end of the API request 115 or the API response 125. Therefore, the proxy API system 150 generates an enriched API request 120 or an enriched API response 128. The proxy API system 150 provides 560 the enriched API request 120 or the enriched API response 128 to its original intended recipient (e.g., the requesting system 110 or providing system 130).

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving, by a proxy system, an API message from a sending system for delivery to a destination system, the API message comprising a set of data fields;
    extracting features from the received API message characterizing data in the API message, wherein the features comprise text strings from the API message;
    determining one or more annotations to be added to the API message comprising an API request or response based on the extracted features, the one or more annotations identifying data types of data included in the set of data fields;
    querying a data store to retrieve reference data stored in relation to one or more of the data fields and the determined annotations, the reference data including additional data fields not included in the set of data fields;
    combining the one or more determined annotations, the retrieved reference data, and the received API message comprising an API request or response to generate an enriched API message; and
    providing, by the proxy system, the enriched API message to the destination system.

2. The method of claim 1, wherein receiving the API message comprises intercepting the API message based on information in at least one data field of the set of data fields.

3. The method of claim 1, wherein the API message is an API request that comprises one or more of a URL, method, header, and body, and wherein the extracted features comprise features extracted from one or more of the URL, method, header, and body of the API request.

4. The method of claim 1, wherein determining one or more annotations describing the extracted features comprises applying the extracted features as input to a trained model.

5. The method of claim 4, wherein the trained model determines a score for each of a subset of annotations stored by the proxy system, the score representing a degree of relevance between the annotation and the received API message, wherein determining one or more annotations describing the extracted features further comprises selecting the one or more annotations based on the annotation scores.

6. The method of claim 1, wherein combining the one or more determined annotations, the retrieved reference data, and the API message comprises appending the one or more annotations and the retrieved reference data to a body of the API message.

7. The method of claim 6, wherein the enriched API message further comprises an indication delineating the appended one or more annotations and the retrieved reference data from the received API message.

8. The method of claim 1, wherein querying a data store to retrieve reference data comprises:
    identifying one or more mappings associated with each of the determined one or more annotations for the API message, each of the one more mappings representing a relationship between the annotation and a reference data; and
    accessing the reference data in the data store based on the identified one or more mappings.

9. The method of claim 1, wherein extracting features from the received API message comprises:
    tokenizing data in the API message into individual string values; and
    extracting a domain feature by analyzing the tokenized data to infer a domain that the data in the API message is related to.

10. The method of claim 1, wherein at least a subset of the extracted features from the API message are string values, and wherein determining one or more annotations describing the extracted features of the API request comprises:
    comparing the string values of the extracted features from the API message to stored annotations; and
    identifying the one or more annotations from the stored annotations based on the comparison.

11. A non-transitory computer readable storage comprising instructions that, when executed by a processor, cause the processor to:
    receive, by a proxy system, an API message from a sending system for delivery to a destination system, the API message comprising a set of data fields;
    extract features from the received API message characterizing data in the API message, wherein the features comprise text strings from the API message;
    determine one or more annotations to be added to the API message comprising an API request or response based on the extracted features, the one or more annotations identifying data types of data included in the set of data fields;
    query a data store to retrieve reference data stored in relation to one or more of the data fields and the determined annotations, the reference data including additional data fields not included in the set of data fields;
    combine the one or more determined annotations, the retrieved reference data, and the received API message comprising an API request or response to generate an enriched API message; and
    provide, by the proxy system, the enriched API message to the destination system.

12. The non-transitory computer readable storage of claim 11, wherein the instructions that cause the processor to receive the API message further comprise instructions that, when executed by the processor, cause the processor to intercept the API message based on information in at least one data field of the set of data fields.

13. The non-transitory computer readable of claim 11, wherein the API message is an API request that comprises one or more of a URL, method, header, and body, and wherein the extracted features comprise features extracted from one or more of the URL, method, header, and body of the API request.

14. The non-transitory computer readable storage of claim 11, wherein the instructions that cause the processor to determine one or more annotations describing the extracted features further comprise instructions that, when executed by the processor, cause the processor to apply the extracted features as input to a trained model.

15. The non-transitory computer readable storage of claim 14, wherein the trained model determines a score for each of a subset of annotations stored by the proxy system, the score representing a degree of relevance between the annotation and the received API message, wherein the instructions that cause the processor to determine one or more annotations describing the extracted features further comprises instructions that, when executed by the processor, cause the processor to select the one or more annotations based on the annotation scores.

16. The non-transitory computer readable storage of claim 11, wherein the instructions that cause the processor to combine the one or more determined annotations, the retrieved reference data, and the API message further comprise instructions that, when executed by the processor, cause the processor to append the one or more annotations and the retrieved reference data to a body of the API message.

17. The non-transitory computer readable storage of claim 16, wherein the enriched API message further comprises an indication delineating the appended one or more annotations and the retrieved reference data from the received API message.

18. The non-transitory computer readable storage of claim 11, wherein the instructions that cause the processor to retrieve reference data further comprise instructions that, when executed by the processor, cause the processor to:
    identify one or more mappings associated with each of the determined one or more annotations for the API message, each of the one more mappings representing a relationship between the annotation and a reference data; and
    access the reference data in the data store based on the identified one or more mappings.

19. The non-transitory computer readable storage of claim 11, wherein the instructions that cause the processor to extract features from the received API message further comprise instructions that, when executed, cause the processor to:
    tokenize data in the API message into individual string values; and
    extract a domain feature by analyzing the tokenized data to infer a domain that the data in the API message is related to.

20. The non-transitory computer readable storage of claim 11, wherein at least a subset of the extracted features from the API request are string values, and wherein the instructions that cause the processor to determine one or more annotations describing the extracted features of the API request further comprise instructions that, when executed by the processor, cause the processor to:
    compare the string values of the extracted features from the API message to stored annotations; and
    identify the one or more annotations from the stored annotations based on the comparison.

* * * * *

UNITED STATES PATENT AND TRADEMARK OFFICE
CERTIFICATE OF CORRECTION

PATENT NO. : 10,666,753 B2
APPLICATION NO. : 15/802156
DATED : May 26, 2020
INVENTOR(S) : Kumar S. Srivastava Page 1 of 1

It is certified that error appears in the above-identified patent and that said Letters Patent is hereby corrected as shown below:

In the Claims

In Column 16, in Claim 8, Line 21, after "one" insert -- or --.

In Column 17, in Claim 13, Line 5, after "readable" insert -- storage --.

In Column 18, in Claim 18, Line 10, after "one" insert -- or --.

Signed and Sealed this
Eighth Day of December, 2020

Andrei Iancu
*Director of the United States Patent and Trademark Office*